(12) United States Patent
Goussard

(10) Patent No.: US 9,373,322 B2
(45) Date of Patent: Jun. 21, 2016

(54) SYSTEM AND METHOD FOR DETERMINING QUERY INTENT

(71) Applicant: Nuance Communications, Inc., Burlington, MA (US)

(72) Inventor: Jacques-Olivier Goussard, Greenfield Park (CA)

(73) Assignee: Nuance Communications, Inc., Burlington, MA (US)

( * ) Notice: Subject to any disclaimer, the term of this patent is extended or adjusted under 35 U.S.C. 154(b) by 479 days.

(21) Appl. No.: 13/859,983

(22) Filed: Apr. 10, 2013

(65) Prior Publication Data

US 2014/0309993 A1     Oct. 16, 2014

(51) Int. Cl.
| G06F 17/20 | (2006.01) |
| G10L 15/00 | (2013.01) |
| G10L 15/06 | (2013.01) |
| G06F 17/27 | (2006.01) |
| G06F 17/30 | (2006.01) |

(52) U.S. Cl.
CPC .............. *G10L 15/063* (2013.01); *G06F 17/27* (2013.01); *G06F 17/30684* (2013.01); *G06F 17/30634* (2013.01)

(58) Field of Classification Search
CPC ....... G10L 15/26; G10L 15/265; G06F 17/20; G06F 17/241; G06F 17/27; G06F 17/2705; G06F 17/271; G06F 17/277; G06F 17/30657; G06F 17/30663; G06F 17/30634; G06F 17/30637; G06F 17/30648; G06F 17/30424
USPC ................ 704/9, 270.1, 270, 275; 379/88.01; 707/705, 713, 718, 771, 769, 776
See application file for complete search history.

(56) References Cited

U.S. PATENT DOCUMENTS

| 6,766,320 | B1 * | 7/2004 | Wang ................... G06F 17/3043 |
| 7,127,456 | B1 * | 10/2006 | Brown et al. |
| 7,761,446 | B2 * | 7/2010 | Bowman et al. .............. 707/727 |
| 8,055,669 | B1 * | 11/2011 | Singhal et al. ................ 707/765 |
| 8,391,464 | B1 * | 3/2013 | Sharp ....................... H04M 3/00 379/265.01 |
| 8,406,384 | B1 * | 3/2013 | Tremblay ................. H04M 3/51 379/67.1 |
| 8,560,539 | B1 * | 10/2013 | Engebretsen ....... G06F 17/3071 707/736 |
| 2003/0217052 | A1 * | 11/2003 | Rubenczyk et al. .............. 707/3 |
| 2004/0254919 | A1 * | 12/2004 | Giuseppini ....................... 707/3 |
| 2006/0190439 | A1 * | 8/2006 | Chowdhury ...... G06F 17/30657 |
| 2007/0136251 | A1 * | 6/2007 | Colledge ............. G06F 17/3064 |
| 2008/0114759 | A1 * | 5/2008 | Yahia ..................... G06Q 30/02 |
| 2009/0077047 | A1 * | 3/2009 | Cooper ............... G06F 17/2785 |
| 2009/0271385 | A1 * | 10/2009 | Krishnamoorthy G06F 17/30445 |
| 2009/0313227 | A1 * | 12/2009 | Dunning et al. ................... 707/3 |
| 2009/0327260 | A1 * | 12/2009 | Li ..................... G06F 17/30672 |
| 2010/0017395 | A1 * | 1/2010 | Wayn et al. ....................... 707/5 |
| 2010/0094854 | A1 * | 4/2010 | Rouhani-Kalleh G06F 17/30646 707/706 |
| 2010/0268725 | A1 * | 10/2010 | Wang ................... G06F 17/2735 707/765 |
| 2010/0306214 | A1 * | 12/2010 | Paparizos .......... G05F 17/30864 707/759 |

(Continued)

*Primary Examiner* — Paras D Shah
(74) *Attorney, Agent, or Firm* — Mark H. Whittenberger, Esq.; Holland & Knight LLP

(57) ABSTRACT

A method for training a system is provided. The method may include storing one or more backend communication logs, each of the one or more backend communication logs including a user query and a corresponding backend query. The method may further include parsing the one or more backend communication logs to extract statistical information and generating a mapping between each user query and a corresponding set of language tags. The method may also include sorting the one or more backend communication logs based upon, at least in part, the extracted statistical information.

17 Claims, 3 Drawing Sheets

(56) References Cited

U.S. PATENT DOCUMENTS

| | | | |
|---|---|---|---|
| 2011/0040733 A1* | 2/2011 | Sercinoglu et al. ........... 707/688 |
| 2011/0066650 A1* | 3/2011 | Fuxman ............ G06F 17/30693 |
| | | 707/776 |
| 2011/0078127 A1* | 3/2011 | Lin ................... G06F 17/30864 |
| | | 707/706 |
| 2011/0314012 A1* | 12/2011 | Kenthapadi ....... G06F 17/30979 |
| | | 707/731 |
| 2012/0059816 A1* | 3/2012 | Narayanan ........ G06F 17/30867 |
| | | 707/710 |
| 2012/0226681 A1* | 9/2012 | Paparizos ............ G06F 17/3053 |
| | | 707/723 |
| 2012/0265784 A1* | 10/2012 | Hsu et al. ....................... 707/771 |
| 2013/0080152 A1* | 3/2013 | Brun ................ G06F 17/30666 |
| | | 704/9 |
| 2013/0086028 A1* | 4/2013 | Hebert ................ G06F 17/3064 |
| | | 707/706 |
| 2013/0332473 A1* | 12/2013 | Ryman ......................... 707/754 |
| 2014/0108460 A1* | 4/2014 | Casella Dos Santos et al. ............................ 707/794 |
| 2014/0172899 A1* | 6/2014 | Hakkani-Tur ..... G06F 17/30522 |
| | | 707/759 |

\* cited by examiner

300

```
mysql> select COUNT(*) from mysql.user;
+----------+
| COUNT(*) |
+----------+
|        5 |
+----------+
1 row in set (0.00 sec)

mysql> set global general_log=OFF;
Query OK, 0 rows affected (0.00 sec)

mysql> select * from mysql.general_log\G;
*************************** 1. row ***************************
  event_time: 2009-02-06 21:19:50
   user_host: root[root] @ localhost []
   thread_id: 1
   server_id: 1
command_type: Query
    argument: select * from mysql.general_log
*************************** 2. row ***************************
  event_time: 2009-02-06 21:20:04
   user_host: root[root] @ localhost []
   thread_id: 1
   server_id: 1
command_type: Query
    argument: select COUNT(*) from mysql.user
*************************** 3. row ***************************
  event_time: 2009-02-06 21:20:09
   user_host: root[root] @ localhost []
   thread_id: 1
   server_id: 1
command_type: Query
    argument: set global general_log=OFF
3 rows in set (0.00 sec)
```

FIG. 3

SYSTEM AND METHOD FOR DETERMINING QUERY INTENT

TECHNICAL FIELD

This disclosure relates to speech recognition systems and, more particularly, to a method for training a speech recognition system using backend communication log mining.

BACKGROUND

Automatic speech recognition may refer to the transcription, by a computing device, of spoken language into readable text. Some speech recognition (SR) systems use "training" where a speaker may read sections of text into the SR system. These systems are often configured to analyze the person's specific voice and use it to fine tune the recognition of that person's speech, resulting in more accurate transcription. Further, many speech recognition systems may include one or more databases of information that may be searched in accordance with a user's spoken words. Some of these systems may involve an operator who may receive a user's inquiry in real-time and may interact with a backend system. This operator may manually tag certain chat/dialog transcripts so as to expedite the connection of a user's query with the most appropriate response for that query. However, manual tagging of these transcripts is often a time and labor-intensive process.

SUMMARY OF DISCLOSURE

In one implementation, a method in accordance with this disclosure, may include storing one or more backend communication logs, each of the one or more backend communication logs including a user query and a corresponding backend query. The method may further include parsing the one or more backend communication logs to extract statistical information and generating a mapping between each user query and a corresponding set of language tags. The method may also include sorting the one or more backend communication logs based upon, at least in part, the extracted statistical information.

One or more of the following features may be included. The method may further include receiving, using the one or more computing devices, a current user query and the corresponding backend query. In some embodiments, the extracted statistical information may include at least one of high runner queries and data priors. The method may also include translating the extracted information into a natural language tag. In some embodiments, the extracted statistical information may include at least one of mandatory fields, optional fields, and disambiguation templates. In some embodiments, the extracted statistical information may include a disambiguation template configured to group one or more user queries and their corresponding backend queries belonging to the same task context. The method may further include extracting interaction templates from the groups of one or more user queries and their corresponding backend queries. In some embodiments, parsing the one or more backend communication logs may include parsing an SQL communication log or a REST communication log.

In some embodiments, a computer-readable storage medium for refining a search is provided. The computer-readable storage medium may have stored thereon instructions that when executed by a machine result in one or more operations. Operations may include storing one or more backend communication logs, each of the one or more backend communication logs including a user query and a corresponding backend query. The method may further include parsing the one or more backend communication logs to extract statistical information and generating a mapping between each user query and a corresponding set of language tags. The method may also include sorting the one or more backend communication logs based upon, at least in part, the extracted statistical information.

One or more of the following features may be included. The method may further include receiving, using the one or more computing devices, a current user query and the corresponding backend query. In some embodiments, the extracted statistical information may include at least one of high runner queries and data priors. The method may also include translating the extracted information into a natural language tag. In some embodiments, the extracted statistical information may include at least one of mandatory fields, optional fields, and disambiguation templates. In some embodiments, the extracted statistical information may include a disambiguation template configured to group one or more user queries and their corresponding backend queries belonging to the same task context. The method may further include extracting interaction templates from the groups of one or more user queries and their corresponding backend queries. In some embodiments, parsing the one or more backend communication logs may include parsing an SQL communication log or a REST communication log.

In another implementation, a system is provided. The system may include one or more processors configured to execute one or more operations. Operations may include storing one or more backend communication logs, each of the one or more backend communication logs including a user query and a corresponding backend query. The method may further include parsing the one or more backend communication logs to extract statistical information and generating a mapping between each user query and a corresponding set of language tags. The method may also include sorting the one or more backend communication logs based upon, at least in part, the extracted statistical information.

One or more of the following features may be included. The one or more processors may be further configured to translate the extracted information into a natural language tag.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a example of a backend log in accordance with an embodiment of the present disclosure.

Like reference symbols in the various drawings may indicate like elements.

DETAILED DESCRIPTION OF THE EMBODIMENTS

Embodiments provided herein are directed towards a system and method for determining the intent of a current user query, for example, a user query associated with a speech recognition application. The current user query may be compared against information pertaining to prior queries, which may be stored in one or more databases. Existing systems may require an operator or backend user to manually tag a chat transcript in order to determine the front end user's intent. For example, a front end user may interact with a voice recognition system over the phone. In this particular example, if the user states "I want to fly from Montreal to Boston", the back end operator may manually tag the origin city as Montreal and the destination city as Boston. Embodiments of the query intent process described herein may be used to perform these actions previously performed by the back end operator. Embodiments of the query intent process may also be used during training of one or more models, for example, for speech recognition and natural language understanding.

The use of backend communication logs as discussed with regard to query intent process 10 may provide several advantages over manual data tagging processes. For example, query intent process does not require access to user chat/dialog transcripts, which are not always available. Additionally and/or alternatively, the backend communication logs may be acquired easily (e.g. each query may be represented as a set of natural language tags). For example, a customer can enable/disable and collect logs easily as it's already part of their infrastructure. Query intent process 10 may also provide a more simplified means of security as the logs may be tokenized.

Embodiments of query intent process 10 may be used with a variety of different types of systems. Some systems may include speech recognition systems, speech understanding systems, textual input, gesture input, or other natural input forms. Any reference to speech recognition systems within the present disclosure are provided merely by way of example.

Figure 1:
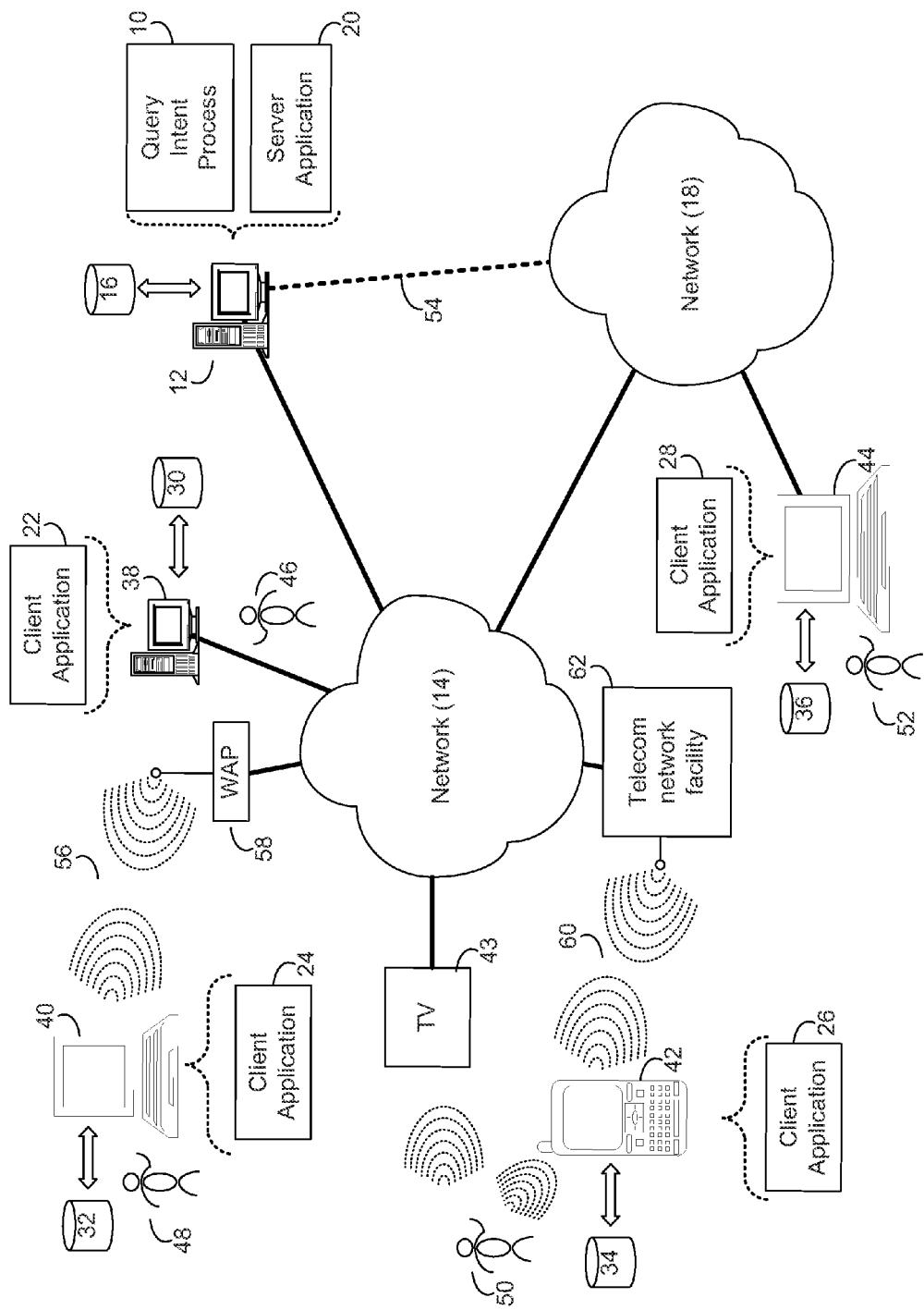
FIG. 1 is a diagrammatic view of a query intent process in accordance with an embodiment of the present disclosure.
Figure 2:
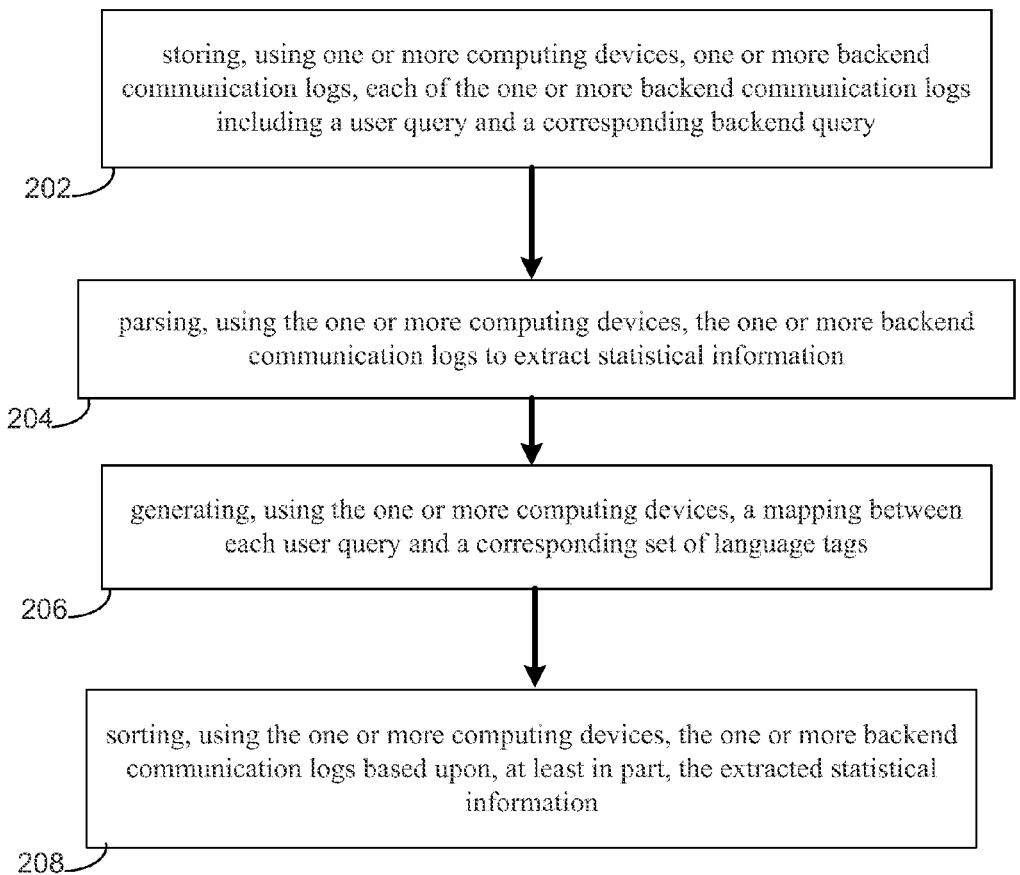
FIG. 2 is a flowchart of a query intent process in accordance with an embodiment of the present disclosure.

Referring to FIG. 1, there is shown a query intent process 10 that may reside on and may be executed by computer 12, which may be connected to network 14 (e.g., the Internet or a local area network). Server application 20 may include some or all of the elements of query intent process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, query intent process 10 may include storing (202) one or more backend communication logs, each of the one or more backend communication logs including a user query and a corresponding backend query. Query intent process 10 may further include parsing (204) the one or more backend communication logs to extract statistical information. Query intent process 10 may also include generating (206) a mapping between each user query and a corresponding set of language tags and sorting (208) the one or more backend communication logs based upon, at least in part, the extracted statistical information The instruction sets and subroutines of query intent process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, query intent process 10 may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). In some embodiments, one or more of server application 20 and client applications 22, 24, 26, and 28 may include speech recognition applications configured to receive and process an utterance from a user (e.g. user 50).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of query intent process 10. Accordingly, query intent process 10 may be a purely server-side application, a purely client-side application, or a hybrid server-side/client-side application that is cooperatively executed by one or more of client applications 22, 24, 26, 28 and query intent process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and query intent process 10 directly through network 14 or through secondary network 18. Further, computer 12 may be connected to network 14 through secondary network 18, as illustrated with phantom link line 54. In some embodiments, users may access query intent process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

The phrase "telecommunications network facility", as used herein, may refer to a facility configured to transmit, and/or receive transmissions to/from one or more mobile devices (e.g. cellphones, etc). In the example shown in FIG. 1, telecommunications network facility 62 may allow for communication between TV 43, cellphone 42 and server computing device 12.

In some embodiments, query intent process 10 described herein may be used in accordance with various types of applications, including, but not limited to, an interactive voice response ("IVR") application. An interactive voice response application typically allows a computing device, such as those described above, to interact with one or more human operators through the use of a telephone keypad or speech recognition system. The majority of IVR applications are meant to replace an operator interacting with a backend system (e.g., an SQL database, REST webservice, etc.), in which the operator acts as a user proxy. Accordingly, very limited data transformation may be performed by the operator. In this way, database operations are likely to be highly correlated with user intent queries. This type of backend system may use a query intent syntax that is close to the natural language ("NL") intent representation. For example, the following action verbs (e.g., INSERT/DELETE/UPDATE/SELECT) may be used in accordance with such a system or database. This type of system may also use a standard query syntax from which query parameters (e.g., intent, object, co-object) can be easily extracted. For example, mapping Structured Query Language ("SQL") verb, column, table to intent object and co-object. This type of system may be configured to operate on objects that usually map to natural language concepts easily (e.g., the database object structure is usually close to the semantic of the objects). Further, this type of system may use a very well defined logging system from which information can be easily extracted and if needed obfuscated (e.g. database SQL archive logs, Hypertext Transfer Protocol ("HTTP") common log format, etc.) without impacting the customer solution, making information extraction from logs easier than with direct user-operator chat/dialog transcripts.

Accordingly, query intent process 10 described herein may be configured to parse backend communication logs having a known syntax (e.g., SQL, REST, etc). An example of a backend communication log is provided in FIG. 3. In this particular example, the output of the log starts after the "********" markers. The queries and the user that initiated them may be logged as shown.

Additionally and/or alternatively, an example of an HTTP server log for a single query is provided below:

[Sat Oct 28 10:52:31 2006] [debug] mod_dumpio.c(67): mod_dumpio: dumpio_in (data-HEAP): GET /nickelode?dest=Mumbai HTTP/1.1\r\n
[Sat Oct 28 10:52:31 2006] [debug] mod_dumpio.c(67): mod_dumpio: dumpio_out (data-HEAP): HTTP/1.1 200 OK\r\nDate: Sat, 28 Oct 2006 14:52:31 GMT\r\nServer: Apache/2.2.3 (Unix)\r\nLast-Modified: Sat, 20 Nov 2004 20:16:24 GMT\r\nETag: "45b81-2c-4c23b600"\r\nAccept-Ranges: bytes\r\nContent-Length: 44\r\nKeep-Alive: timeout=5, max=100\r\nConnection: Keep-Alive\r\nContent-Type: text/html\r\n\r\n Query intent process 10 may be further configured to allow for log obfuscation of user sensitive data (e.g. credit card number masking, etc.). In some embodiments, query intent process 10 may be configured to sort queries per base intent (e.g. insert/update/delete/select) and object (e.g., table, etc.). If available, query intent process 10 may cluster queries per transaction/user dialog (e.g., SQL has a transaction concept that may be used in this way) to allow for definitions of dialogs at the backend server (e.g. server computing device 12 shown in FIG. 1).

In some embodiments, query intent process 10 may utilize a mapping between the natural language meaning representation to translate database queries into natural language tags. Additionally and/or alternatively, query intent process 10 may be configured to extract various types of information (e.g., high runner queries, data priors, mandatory fields, optional fields, disambiguation templates, etc.). Accordingly, detected high runner queries, once translated into natural language tags, may be used as inputs to a grammar tool (e.g. QuickNLU, etc.) to ensure they are properly covered by the input data. In some embodiments, data priors may be used to add weight to grammars automatically generated from samples.

In some embodiments, query intent process 10 may be configured to store (202) one or more backend communication logs in a storage device such as storage device 16 shown in FIG. 1. Each backend communication log may include a user query and a corresponding backend query (e.g. each of which may be housed within storage device 16) corresponding to the user query.

Using the example provided above, a user (e.g. user 50) may communicate with an operator, who may be located at any point within network 14, using telecommunications network facility 62. Again, using the above example, user 50 may state "I want to fly from Montreal to Boston" and the back end operator may manually tag the origin city as Montreal and the destination city as Boston or may manually translate this as a backend query that may be run and logged on the actual backend system. In this way, a rich database of tagged backend communication logs may be stored within storage device 16.

In some embodiments, query intent process 10 may be configured to parse (204) through the backend communication logs within storage device 16 in order to extract statistical information associated with the backend communication logs. For example, some types of information may include, but are not limited to, high runner queries, data priors, mandatory fields, optional fields, and disambiguation templates. A disambiguation template may refer to a group of user queries and backend query pairs that may represent a dialog (as opposed to a single user query and backend query pair). For example, if a user interacted with the system multiple times before obtaining a successful result. In some embodiments, this may include extracting interaction templates from the groups of one or more user queries and their corresponding backend queries. User queries and backend query pairs may be grouped using any suitable technique. For example, in some embodiments, certain user queries that have one or more commonalities may be grouped together.

In some embodiments, query intent process 10 may be configured to translate the extracted information into a natural language tag. This is the process to translate backend tags into natural language tags. For example, if the user says "I want to fly from boston to montreal", the operator would translate that into a backend SQL query (assuming SQL): SELECT * FROM DB_flight_table WHERE DB_origin=Boston AND DB_destination=Montreal. This query would be logged. Now, if an NLU system uses 'FLIGHT' and 'SOURCE' instead a DB_flight and DB_origin—these may require translation as well.

As discussed above, query intent process 10 may be used in accordance with any type of system. In this way, query intent process 10 may be used in accordance with numerous different types of programming languages and software architectures. For example, some backend communication logs may include, but are not limited to, Structured Query Language ("SQL") compatible communication logs, Representational State Transfer ("REST") compatible communication logs, etc. It should be noted that the teachings of the present disclosure is not intended to be limited to any particular communication log format.

In some embodiments, query intent process 10 may be configured to generate (206) a mapping between each user query and a corresponding set of language tags. As discussed above, query intent process 10 may generate a mapping between the natural language meaning representation to translate database queries into natural language tags. This mapping may be dynamically updated as additional user queries are received as is discussed in further detail below.

In some embodiments, query intent process 10 may be configured to sort (208) through the one or more backend communication logs based upon, at least in part, the extracted statistical information. For example, query intent process 10 may be configured to sort through the plurality of groups by determining the most common user queries. Additionally and/or alternatively, query intent process 10 may be configured to sort the plurality of groups by one or more natural language tags associated with the user query. Any suitable technique, using any information associated with a backend communication log, may be used to sort in accordance with the teachings of the present disclosure.

In some embodiments, query intent process 10 may be configured to generate a statistical model based upon the communication logs and the mapping generated between the user query and natural language tags.

In operation, query intent process 10 may receive a current user query. For example, user 50 may state "I want to fly from Montreal to Boston" into smartphone 42. This query may be transmitted through network 14, via telecommunications network facility 62, to server computing device 12. Query intent process 10 may be configured to compare the current user query with the plurality of groups of user queries, which may be stored within storage device 16 and/or accessible by server computing device 12. In some embodiments, this may involve the user query and the associated backend query information. Query intent process 10 may be further configured to identify one of the plurality of groups of user queries that corresponds to the current user query. This identification may be based upon determining a commonality between information associated with the current user query and any information stored regarding the groups of stored user queries.

In some embodiments, query intent process 10 may be configured to update the mapping between the database and the each stored user query (or grouping of queries) based upon the current user query. In this way, query intent process 10 may be configured to dynamically update as new queries are received.

Accordingly, the query intent process 10 described herein may provide numerous advantages over existing systems. For example, in previous systems, when building a new domain expertise (e.g. banking, travel reservations, etc.), the backend system may be used to bootstrap the ontology. For example, from the database schemas for an SQL backend. However, this type of arrangement provides only minimal information on the available operations on the data or the priors associated to operations (e.g., is it more likely to ask for your checking account balance rather than for your savings one). As a result, prior systems required the manual tagging of data to detect this type of situation. In contrast, the backend log mining approach of query intent process 10 may be configured to provide a list of high-runners of user query intents and their prevalence. For example, query intent process 10 may be configured to detect that "SELECT MEETINGS FROM CALENDAR WHERE DATE: today" is more likely than "SELECT MEETINGS FROM CALENDAR WHERE DATE: today AND CONTACT: bill AND LOCATION: confroom".

Additionally, in prior systems, in a new domain, default concept values are not known without user data. For example, if the system assumes that a user query for his/her list of meetings is intended for today that may not be a valid assumption (e.g. it could be for the week). Accordingly, the backend log mining of query intent process 10 described herein may provide the prevalence of queries for such a query parameter (e.g. DATE:<this week> versus DATE:<this day>) without the need for tagged data. In some embodiments, the backend log mining of query intent process 10 may provide indications on the mandatory parameters of queries hence collection modes for concepts. Weights on data may also be inferred from their frequency in the database logs (e.g. for non-obfuscated data).

Often, in certain applications (e.g. voice, text, IVR), a disambiguation dialog, such as those discussed above, may be used. For example, where a precise item in a list must be selected (e.g., a given travel itinerary, a particular movie venue etc). The strategy to disambiguate is usually pre-defined at the application design stage, without a priori knowledge of the best disambiguation algorithm (e.g., will a user select the flight by price, by flight length etc). Accordingly, the backend communication logs associated with query intent process 10 may provide invaluable information in this regard, e.g., if each constraint added by the user translates into a new backend query parameter. In this way, query intent process 10 may allow for the design of dialogs that are better tailored to the actual application usage.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

As discussed above, the computing system may include clients and servers. A client and server are generally remote from each other and typically interact through a communication network such as those shown in FIG. 1. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for use with an interactive voice response system comprising:
    storing, using one or more computing devices implementing an interactive voice response application, a plurality of backend communication logs, each of the plurality backend communication logs including a user query and a corresponding backend query;
    parsing, using the one or more computing devices, the plurality of backend communication logs to extract statistical information;
    translating the extracted statistical information into a natural language tag;
    generating, using the one or more computing devices, a mapping between each user query and a corresponding set of language tags based on the translating;
    sorting, using the one or more computing devices, the plurality of backend communication logs based upon, at least in part, the extracted statistical information and the mapping;
    receiving, using the one or more computing devices, a current user query, at the interactive voice response application, and the corresponding backend query;
    updating the interactive voice response application by dynamically updating the mapping, wherein dynamically updating the mapping is based upon, at least in part, a current user query being received and a determined commonality between the current user query and at least one of a previous user query, wherein the determined commonality associates the current user query with the corresponding set of language tags for the previous user query;
    determining a query intent for a subsequent user query, received via the interactive voice response application, based on the sorted backend communication logs and the updated mapping; and
    providing, via the interactive voice response application, a database response to the user based upon, at least in part, the determined query intent and the backend communication log.

2. The method of claim 1, wherein the extracted statistical information includes at least one of high runner queries and data priors.

3. The method of claim 1 wherein the extracted statistical information includes at least one of mandatory fields, optional fields, and disambiguation templates.

4. The method of claim 3, wherein the extracted statistical information includes a disambiguation template configured to group one or more user queries and their corresponding backend queries, wherein the one or more user queries represent a user dialog.

5. The method of claim 4 further comprising:
    extracting interaction templates from the dialog, wherein the interaction templates include tailored dialog strategies.

6. The method of claim 3 wherein the extracted statistical information includes a disambiguation template configured to group a plurality of user queries and their corresponding backend queries belonging to the same task context.

7. The method of claim 6 further comprising:
    extracting interaction templates from the groups of the plurality of user queries and their corresponding backend queries.

8. The method of claim 1 wherein parsing the one or more backend communication logs includes parsing an SQL communication log.

9. The method of claim 1, wherein parsing the one or more backend communication logs includes parsing a REST communication log.

10. A non-transitory computer readable storage medium having stored thereon instructions that when executed by a processor perform one or more operations for use with an interactive voice response system, the operations comprising:
    storing, using one or more computing devices implementing an interactive voice response application, a plurality of backend communication logs, each of the plurality backend communication logs including a user query and a corresponding backend query;
    parsing, using the one or more computing devices, the plurality of backend communication logs to extract statistical information;
    translating the extracted statistical information into a natural language tag;
    generating, using the one or more computing devices, a mapping between each user query and a corresponding set of language tags based on the translating;
    sorting, using the one or more computing devices, the plurality of backend communication logs based upon, at least in part, the extracted statistical information and the mapping;
    receiving, using the one or more computing devices, a current user query, at the interactive voice response application, and the corresponding backend query;
    updating the interactive voice response application by dynamically updating the mapping, wherein dynamically updating the mapping is based upon, at least in part, a current user query being received and a determined commonality between the current user query and at least one of a previous user query, wherein the determined commonality associates the current user query with the corresponding set of language tags for the previous user query;

determining a query intent for a subsequent user query, received via the interactive voice response application, based on the sorted backend communication logs and the updated mapping; and providing, via the interactive voice response application, a database response to the user based upon, at least in part, the determined query intent and the backend communication log.

11. The non-transitory computer readable storage medium of claim 10, wherein the extracted statistical information includes at least one of high runner queries and data priors.

12. The non-transitory computer readable storage medium of claim 10 wherein the extracted statistical information includes at least one of mandatory fields, optional fields, and disambiguation templates.

13. The non-transitory computer readable storage medium of claim 12 wherein the extracted statistical information includes a disambiguation template configured to group a plurality of user queries and their corresponding backend queries belonging to the same task context.

14. The non-transitory computer readable storage medium of claim 13 wherein operations further comprise:

extracting interaction templates from the groups of the plurality of user queries and their corresponding backend queries.

15. The non-transitory computer readable storage medium of claim 10 wherein parsing the one or more backend communication logs includes parsing an SQL communication log.

16. The non-transitory computer readable storage medium of claim 10, wherein parsing the one or more backend communication logs includes parsing a REST communication log.

17. An interactive voice response system comprising:

one or more processors configured to execute one or more operations, the operations including:

storing, using one or more computing devices implementing an interactive voice response application comprising at least a portion of an interactive voice response system, one or more a plurality of backend communication logs, each of the one or more plurality backend communication logs including a user query and a corresponding backend query;

parsing, using the one or more computing devices, the one or more plurality of backend communication logs to extract statistical information;

translating the extracted statistical information into a natural language tag;

generating, using the one or more computing devices, a mapping between each user query and a corresponding set of language tags based on the translating;

sorting, using the one or more computing devices, the one or more plurality of backend communication logs based upon, at least in part, the extracted statistical information and the mapping;

receiving, using the one or more computing devices, a current user query, at the interactive voice response application, and the corresponding backend query; and updating the interactive voice response system application by dynamically updating the mapping, wherein dynamically updating the mapping is based upon, at least in part, a current user query being received and a determined commonality between the current user query and at least one of a previous user query, wherein the determined commonality associates the current user query with the corresponding set of language tags for the previous user query;

determining a query intent for a subsequent user query, received via the interactive voice response application, based on the sorted backend communication logs and the updated mapping; and providing, via the interactive voice response application, a database response to the user based upon, at least in part, the determined query intent and the backend communication log.

* * * * *